Nov. 17, 1959
W. L. SEALE
2,913,150
FERTILIZER DISTRIBUTOR
Filed Nov. 21, 1956
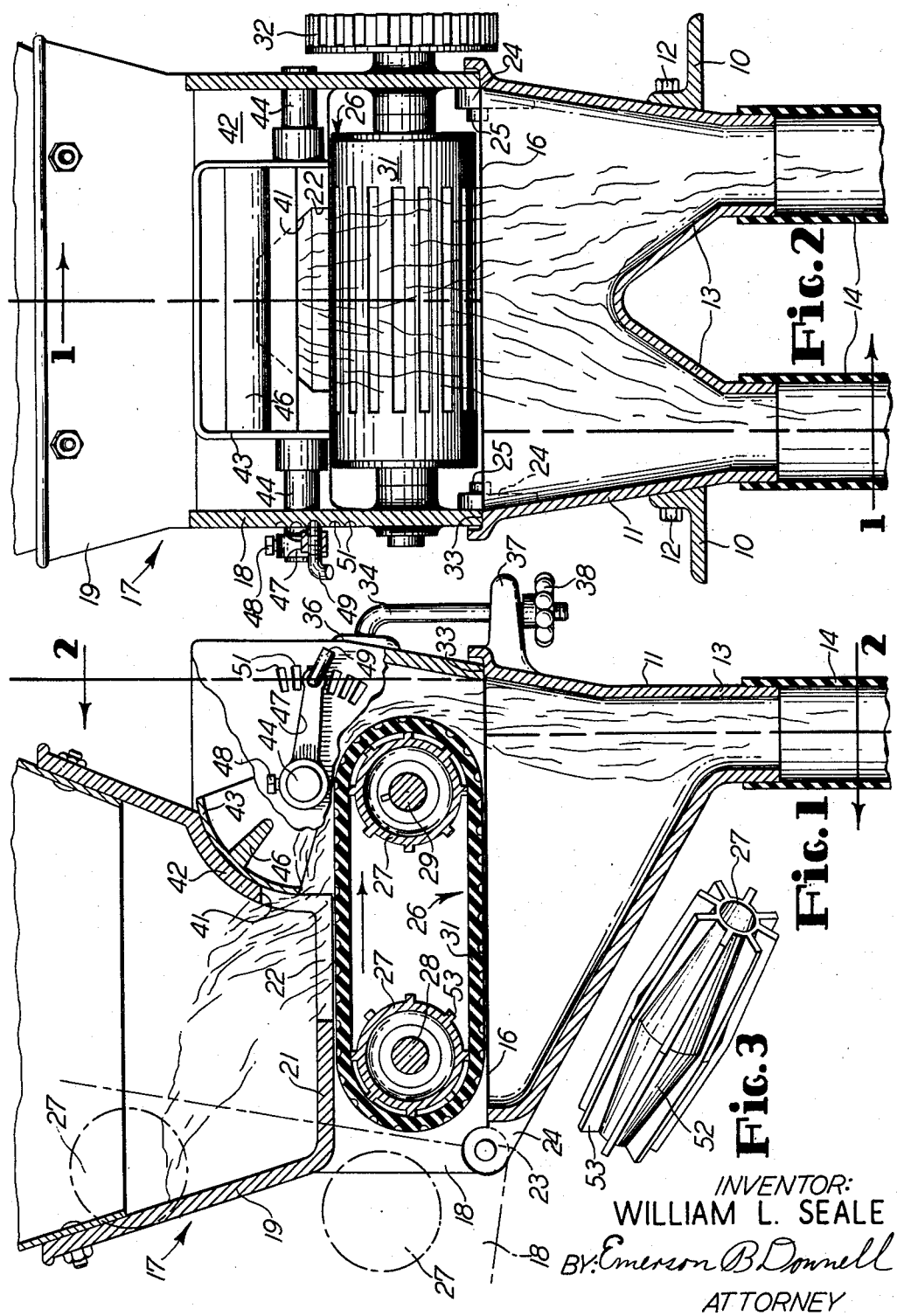
INVENTOR:
WILLIAM L. SEALE
BY: Emerson B Donnell
ATTORNEY

United States Patent Office 2,913,150
Patented Nov. 17, 1959

2,913,150

FERTILIZER DISTRIBUTOR

William L. Seale, East Gadsden, Ala., assignor to J. I. Case Company, Racine, Wis., a corporation of Wisconsin Application November 21, 1956, Serial No. 623,708

4 Claims. (Cl. 222—310)

This invention relates to fertilizer distributors of the type for use on farms.

It is an object of this invention to provide a fertilizer distributor wherein the hopper can be easily and readily cleaned of any fertilizer remaining therein after a fertilizing operation.

Another object of this invention is to provide a distributor wherein the fertilizer is moved through the distributor with less likelihood of solidifying in the hopper and clogging the feeder. This object is accomplished by providing a special opening for the passage of the fertilizer from the hopper, and a special feeder and gate arrangement, and one large passage which divides into two outlet passages as desired.

Still another object of this invention is to provide a distributor wherein the flow and feeding of the fertilizer are improved and the hopper and adjacent parts can be more readily serviced, cleaned, and repaired.

Other objects and advantages will become apparent upon reading the following description in conjunction with the accompanying drawings, wherein:

Fig. 1 is a sectional view of a preferred embodiment of this invention taken on the line 1—1 of Fig. 2 and with parts broken away and showing in dot-dash lines a second position of the hopper.

Fig. 2 is a sectional view taken on the line 2—2 of Fig. 1.

Fig. 3 is a reduced perspective view of a part shown in Figs. 1 and 2.

The same reference numerals refer to the same parts throughout the two views of the drawings, and the specification.

It will be apparent to those skilled in the art that the preferred embodiment shown is the type of fertilizer distributor normally mounted on a tractor for movement over farm land to be fertilized. Of course, those parts which are well-known are not shown in the drawings, but the drawings show those features which are novel to the heretofore known machines of this type. The drawings show two angle irons 10 which form the support frame for the distributor or feeder and which can be attached to a tractor, as mentioned. The irons 10 are shown to support a lower portion or base member 11 through bolts 12. The member 11 is bifurcated in two outlets 13 which each have the usual flexible outlet conduit 14 attached thereto and depending therefrom to the ground below. The member 11 is also hollow to present an upwardly directed opening around the upper edge 16. In this regard, it should be noted that the upper opening or chamber in the member 11 is large while the lower outlets 13 are smaller but of a suitable size. With this arrangement, the fertilizer will freely move through the large passages above without clogging the machine, and only the outlets 13 and 14 are reduced to the specific size desired, thereby avoiding the danger of clogging the machine at points of fertilizer movement leading to the outlets. Of course, the wavy lines on the drawings indicate the flow of fertilizer, which could be lime or the like.

Pivotally mounted on the member 11 is a hopper member 17 including a lower box-like portion 18 and an upper hopper portion 19. As shown, the hopper is funnel-shaped and includes a wall or partition 21 which has an opening 22. The lower portion 18 includes flanges, such as the flange 23, which are juxtaposed to flanges 24 on the base member 11. Pins 25 pass through the flanges 23 and 24, forming a hinge connection or pivotal mounting of the hopper on the base member. With this arrangement, the hopper member 17 can pivot from the solid line position shown to the dot-dash line position of Fig. 1. When the hopper member is pivoted, any remaining fertilizer in the hopper can be shoveled or scooped from the hopper much more conveniently than it could be removed if the hopper remained in the shown upright position. Also, any fertilizer blocking the opening 22 can be removed therefrom, and the bottom of the hopper and the parts therebelow can be readily serviced when the hopper is pivoted upwardly. Also, the parts can be cleaned, such as the hopper, the opening 22, the outlets 14, and the like.

Mounted within the lower portion 18 is a feeder member or apron 26 consisting of a pair of spaced apart rollers 27 mounted on shafts 28 and 29. A corrugated belt or conveyor 31 is trained over the rollers 27 and therebetween, as shown. This arrangement positions the conveyor 31 immediately below the opening 22, and the conveyor extends beyond the opening. The shaft 29 is driven by a sprocket 32 thereon and a conventional drive chain (not shown) engages the sprocket to rotate the latter along with the roller 27 which is shown keyed to the shaft 29. In this manner, the conveyor 31 is moved in the direction of the arrow shown to carry the fertilizer from the opening 22 and into the base member 11.

It will be noted that the upper edge 16 of the base member terminates in shoulders 33 for upwardly supporting the hopper member 17 when the latter is in the full line position. A clamp in the form of an angled tie rod 34 is movably anchored at one end to a boss 36 on the lower portion 18 of the hopper and the opposite end of the rod 34 projects beyond a fork 37 attached to the base member 11. A hand nut 38 is threaded on the lower end of the rod 34 to press against the underside of the fork 37 and thereby secure the hopper 17 in its shown operating position. Of course, the nut 38 can be loosened and the nut and rod can then be swung clear of the fork 37 when the hopper is pivoted to and from its operating position.

It will be seen that a second opening 41 is also provided on an arcuate wall 42 of the hopper 19. Fig. 2 shows the opening 41 to be trapezoidal, and, with this shape, it should be seen that the fertilizer will slide down the convex face of the wall 42 and drop through the opening. The opening is shaped to conform to the angle of repose of the fertilizer on the wall 42.

An arcuately shaped gate 43 is rotatably mounted on the lower portion 18 by means of trunnions 44 forming a part of the gate 43. The center of curvature of the gate is co-incident with that of the wall 42, and said center is the axis of the trunnions 44. Of course the gate 43 can slide snugly over the concave side of the wall 42 and thereby expose more or less of the opening 41, as desired. A rib 46 is a part of the gate 43 and it extends a distance toward the gate axis of rotation such that when the gate is fully raised to expose a maximum of the opening 41, the rib 46 acts as a baffle against which the fertilizer will impinge if it is piled high. In this event, the rib 46 will serve to direct the fertilizer downwardly and help to crush any lumps of fertilizer.

A lever 47 is adjustably secured by a set screw 48 to one of the trunnions 44. Thus, the angle between the gate and the lever can be adjusted and set. The opposite end of the lever 47 receives an angled bolt 49 which threads through the lever and abuts indentations 51 in the side of the portion 18. The gate 43 can thus be locked in a selected position with respect to the opening 41 as the bolt 49 is located in a selected one of the indentations 51.

Figs. 1 and 3 show the shape of the rollers 27. The cores 52 of the rollers are tapered or conical from the transverse center and toward both ends. The rollers include vanes or projections 53 radial of the cores 52 and also slightly tapered from the transverse center. The radially outer edges of the vanes 53 engage the under surface of the belt 31 and the taper on the vanes causes the belt to be aligned on the rollers. The conical shape of the roller cores 52 causes the rollers to be self-cleaning of any stray fertilizer that tends to collect on the rollers. Because of the taper, the stray fertilizer will tend to fall off the rollers; but if the fertilizer accumulates between the vanes, the pressure from the belt will positively squeeze the fertilizer off the rollers. Of course, several factors contribute to the collecting of fertilizer on the rollers; the fertilizer might fall onto them or it might be blown onto them if the fertilizer is of a dusty type.

While a specific embodiment of this invention has been shown and described, it should be obvious that certain changes could be made, and this invention should therefore be limited only by the scope of the appended claims.

What is claimed is:

1. In a feeder for granular fertilizer material, an elongated bifurcated base member, an upstanding hopper including a box-like lower portion downwardly open and having a hinge connection to one end of said base member and forming therewith a generally closed feeding chamber, said box-like lower portion having an upper wall, said hopper including an upper portion extending upwardly from said box-like lower portion, said upper wall forming a bottom for said upper portion and having a first opening for passage of material from said upper portion into said box-like lower portion, a movable corrugated feeder apron positioned across said first opening and supported from said lower portion in position to form a continuation of said upper wall beyond the margin of said upper portion and to the side thereof distal from said hinge connection, a pair of outlet conduits leading downwardly from said base member, spaced laterally of each other and on either side of the path of movement of said movable feeder, said side of said upper portion having a second opening therein forming a continuation of said first opening above said feeder apron distal from said hinge connection, and means for moving said feeder apron adjacent said first opening in a direction away from said hinge connection.

2. In a feeder for granular material, an elongated base member, an upstanding hopper including a lower portion downwardly open, box-like, having a hinge connection to one end of said base member and forming therewith a generally closed feeding chamber, said box-like lower portion having an upper wall, said hopper including an upper portion having a front wall extending upwardly from said box-like lower portion, and having an arcuate portion in the form of a section of a cylindrical surface, said upper wall forming a bottom for said upper portion and having an opening for passage of material from said upper portion into said box-like lower portion, a movable feeder member positioned across said opening and supported from said lower portion in position to form a continuation of said upper wall beyond the margin of said upper portion to the side thereof distal from said hinge connection, an outlet conduit leading downwardly from said base member, said arcuate portion of said front wall having an outlet therein above said feeder member and continuous with said opening in said upper wall, a gate in the form of a segment of a cylinder, nested in said arcuate portion of said front wall partially blocking said outlet in said front wall, said gate being rotatable about the center line of said arcuate portion into other positions to block different proportions of said outlet, and means for moving said feeder member in a direction away from said hinge connection.

3. In a fertilizer feeder of the type including an upper hopper portion and a movable conveyor therebelow and an outlet conduit below said conveyor, the combination of an arcuately shaped lower wall on said upper hopper portion with the axis of the arc being horizontally spaced downwardly from said upper hopper portion, said wall having an opening therethrough with the lower end of said opening being longer than the upper end thereof, an arcuately shaped gate juxtaposed on said wall and pivotally mounted about said axis for sliding movement snugly over said opening, a baffle attached to said gate to extend toward said axis for deflecting fertilizer downwardly when the latter passes through said opening, pivotal mounting means attached to said gate to support the latter on said wall, said conveyor being disposed beyond the horizontal extents of said gate, and indexing means connected to said mounting means for securing said gate in a selected position over said opening.

4. In a fertilizer feeder, the combination of a hopper having a lower opening, a roller rotatably mounted below said opening for travel therepast, said roller including a core conically shaped in reduced diametrical dimensions measured in progressions along the axis of said roller from the center to both ends thereof said roller also including a plurality of radially disposed vanes extending beyond the circumference of said core and disposed on a cone shape oriented with that of said core, and a belt trained over said vanes of said roller for movement therewith and transporting fertilizer from said opening to the end of travel of said belt.

References Cited in the file of this patent

UNITED STATES PATENTS

| 15,640 | Beecher | Sept. 2, 1856 |
| 613,026 | Cochran | Oct. 25, 1898 |
| 1,405,037 | Kaupke | Jan. 31, 1922 |
| 1,746,410 | Tolman | Feb. 11, 1930 |
| 2,279,475 | Merrick | Apr. 14, 1942 |
| 2,584,750 | Spanski | Feb. 5, 1952 |

FOREIGN PATENTS

| 238,901 | Germany | Dec. 14, 1909 |